(12) United States Patent
Delker et al.

(10) Patent No.: US 8,107,931 B1
(45) Date of Patent: Jan. 31, 2012

(54) NETWORK BASED INTERACTIVE CLIENT (75) Inventors: Jason R. Delker, Olathe, KS (US); John M. Everson, Leawood, KS (US); Michael A. Gailloux, Overland Park, KS (US); Carl J. Persson, Olathe, KS (US); Jason K. Whitney, Lee's Summit, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 592 days.

(21) Appl. No.: 12/264,775

(22) Filed: Nov. 4, 2008

(51) Int. Cl.
*H04M 3/42* (2006.01)

(52) U.S. Cl. .................. 455/414.1; 455/414.2; 455/411; 455/418; 455/419; 455/457; 709/200; 709/203; 709/207; 709/238; 709/250

(58) Field of Classification Search ............... 455/414.1, 455/456–457, 414.2, 411, 418–419; 709/200, 709/203, 207, 238, 250
See application file for complete search history.

(56) References Cited

U.S. PATENT DOCUMENTS

| 7,693,953 | B2 * | 4/2010 | Middleton et al. ............ 709/207 |
| 2008/0132251 | A1 * | 6/2008 | Altman et al. ................. 455/457 |

* cited by examiner

*Primary Examiner* — Charles Appiah
*Assistant Examiner* — Michael Vu (57) ABSTRACT

A method is provided. The method comprises a proxy application logging into a first internet service on behalf of a handset, the proxy application executing on a computer system in a communications service provider network. The method also comprises the proxy application logging into a second internet service on behalf of the handset and mediating communication between the first internet service and the handset and between the second internet service and the handset. The method also comprises collecting information about locations of the handset, communications of the handset, and transactions conducted using the handset. The method also comprises the proxy application providing the information to define a presence of a user of the handset to one of the first internet service and the second internet service.

15 Claims, 5 Drawing Sheets

NETWORK BASED INTERACTIVE CLIENT

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile communication has become widely deployed worldwide. A wide variety of devices currently provide mobile communication capability including mobile phones, laptop computers, tablet computers, personal digital assistants (PDAs), and other portable electronic devices. These mobile devices exhibit a considerable range of functionality and technical refinement, from very fully featured and powerful processors to relatively simple and limited processors. In particular, the operating system of some of the mobile devices, for example low cost mobile phones and/or personal digital assistants, may rely upon single threaded processing. Single threaded processing means that the operating system executes one application or process at a time, from start to completion. In a single threaded mobile phone operating system, for example, it generally may not be possible to concurrently carry on an interactive game and receive a voice call.

An increasingly popular application of mobile communication is social networking. Social networking involves online communities of people sharing interests and activities using the communication networks to promote their interactions. Social networking can involve people networking to expand their professional contacts, for example to make contact with sales prospects and to make contact with hiring decision makers. Social networking can involve people networking to learn about and/or teach a hobby or special interest.

SUMMARY

In an embodiment, a method is provided. The method comprises a proxy application logging into a first internet service on behalf of a handset, the proxy application executing on a computer system in a communications service provider network, the proxy application logging into a second Internet service on behalf of the handset, and the proxy application mediating communication between the first Internet service and the handset and between the second internet service and the handset. The method also comprises collecting an information about at least one of time stamped locations of the handset, time stamped communications of the handset, and time stamped transactions conducted using the handset and the proxy application providing the information to at least one of the first internet service and the second internet service.

In another embodiment, a system is disclosed. The system comprises at least one processor and a component. The component, when executed by the at least one processor, establishes sessions on behalf of a user of a handset with a plurality of Internet services, determines a presence information associated with the handset, transmits the presence information to at least one of the internet services, and mediates communications between the handset and the internet services. The processor is not co-located with the handset and is not co-located with the internet services.

In another embodiment, a system is disclosed. The system comprises a computer system and an application. The application, when executed on the computer system, logs into a plurality of internet services on behalf of a user of a handset, wherein the Internet services includes a first Internet service. The application further provides presence information associated with the handset to the internet services, converts a first message received from the first Internet service in a native format of the first internet service to a second message formatted in a short message service format, and sends the second message to the handset. The application further receives a third message formatted in the short message service format from the handset, converts the third message to a fourth message in the native format of the first Internet service, and sends the fourth message to the first internet service.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

A system is taught that promotes a mobile device, for example a mobile phone, maintaining a presence on one or more Internet service sites while the mobile device is actively engaged in other processing. Some mobile devices, referred to herein as single threaded devices, may be limited to executing a single application at a time. For example, a low-cost mobile phone may not be able to send information to a social networking site while executing a gaming application, while conducting a voice call, while browsing an Internet site, or while executing other applications. In an embodiment, a proxy application executing on a server computer may be authorized by the mobile device to login on behalf of the mobile device to one or more Internet services to which the mobile device is subscribed or registered at. In an embodiment, the proxy application remains logged into the Internet services for an extended period of time, for example for a day at a time or a week at a time or some other extended time interval. The proxy application may provide presence information for the user of the mobile device to the Internet services. For example, the proxy application may indicate that the mobile device is off-line, that the mobile device is out of town, that the user of the mobile device is in a business meeting, that the user of the mobile device is on a date, and other presence information.

Other limitations of mobile devices may present challenges for directly communicating with social networking sites, for example limited battery life of the mobile device, internet protocol (IP) address space usage conservation concerns, lack of data push capabilities on the mobile device, data network coverage, point-to-point protocol and Internet protocol (PPP/IP) ports used at the packet data serving node (PDSN), and other limitations. The advantages of communicating with social network sites through the intermediary of the proxy application may likewise help to overcome the above identified limitations of some mobile devices. A low cost mobile device may not support internet connectivity or data communications. This low cost mobile device may be able to use the short message service (SMS) to communicate with social networking sites via the proxy application.

In an embodiment, the user of the mobile device may update a personal profile with information about the location of the user, the activities of the user, and other information about the user, and the proxy application may access the personal profile. In an embodiment, the user of the mobile device may enter information in the personal profile that defines a schedule of activities of the user. This information about the activities of the user may identify the favorite television program of the user and indicate the time that this television program airs in the location of the user. Some of the presence information provided by the proxy application may come from the personal profile controlled by the user of the mobile device. Other of the presence information provided by the proxy application, however, may be known to the proxy application. In an embodiment, for example, the proxy application is executed on a server computer in a wireless service provider network that is aware of the location of the mobile device and hence, by inference, the location of the user of the mobile device as well as the on-line/off-line status of the mobile device.

The proxy application may also promote communication between the Internet services and the mobile device in a non-intrusive manner. For example, the proxy application may receive a message directed to the mobile device from a first Internet service in a first format native to the first Internet service. The proxy application may translate the message from the first format to a second format which may be received by the mobile device in a manner which does not interfere with an application currently executing on the mobile device. For example, the proxy application may translate the message from the first format to a short message service (SMS) message format which may be received by the mobile device without interfering with the application currently executing on the mobile device. The mobile device may be able to reply to the message sent in the first format by sending a reply message in the second format to the proxy application. The proxy application may translate the reply message in the second format to the first format and send the translated reply in the first format to the first Internet service.

In an embodiment, the execution of the proxy application on a server computer in a wireless service provider network promotes the proxy application further securing the communications between the Internet services and the mobile device based on secure keys maintained by the wireless service provider in association with the wireless communication services provided to the mobile device.

Figure 1:
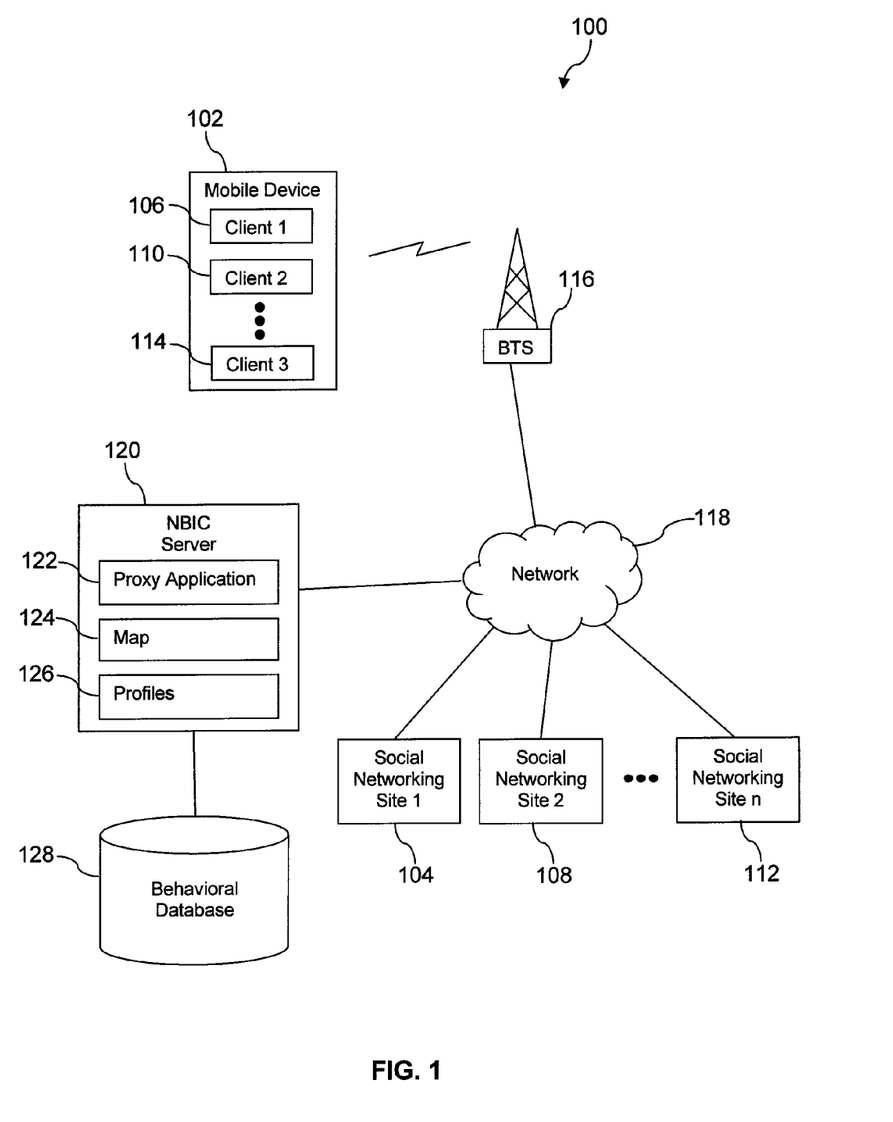
FIG. 1 is an illustration of a communication system according to an embodiment of the disclosure.

Turning now to FIG. 1, a communication system 100 is illustrated. The system 100 comprises a mobile device 102, a first social networking site 104, a second social networking site 108, and a third social networking site 112. The mobile device 102 communicates with a network 118 via a base transceiver station (BTS) 116. The system 100 further comprises a network based interactive client (NBIC) server 120 and a behavioral database 128. Under different conditions, the mobile device 102 may communicate with the social networking sites 104, 108, 112 directly, through the base transceiver station 116 and through the network 118 or, alternatively, indirectly through the base transceiver station 116, through the network 118, and through the network based interactive client server 120. While three social networking sites 104, 108, 112 are illustrated, it is understood that any number of social networking sites may be present in the system 100. While a single base transceiver station 116 is illustrated, it is understood that many more base transceiver stations may be present in the system 100. While a single mobile device 102 is illustrated, it is understood that many more mobile devices may be present in the system 100.

The mobile device 102 may be any of a mobile phone, a personal digital assistant (PDA), a media player, a personal digital television, a laptop computer, a tablet computer, and other portable electronic devices. An embodiment of a mobile phone is described in greater detail hereinafter. In an embodiment, the mobile device 102 may be a single threaded device, for example a mobile device having an operating system that does not support multiprocessing and/or multiple concurrent threads of processing control. In other embodiments, however, the mobile device 102 may be a multi-threaded device having an operating system that supports concurrent processing of multiple applications and/or multiple concurrent threads of processing control. The mobile device 102 may have limited battery life, may lack data push capabilities, and may not support internet connectivity and/or data communications. The environment in which the mobile device 102 may operate may be subject to concerns about Internet protocol (IP) address space usage conservation and may lack data network coverage.

The mobile device 102 may comprise a plurality of clients, for example a first client 106, a second client 110, and a third client 114. The clients 106, 110, 114 promote interactions between the user of the mobile device 102 and the social networking sites 104, 108, 112. For example, the first client 106 may promote interactions between the user of the mobile device 102 and the first social networking site 104; the second client 110 may promote interactions between the user of the mobile device 102 and the second social networking site 108; and the third client 114 may promote interactions between the user of the mobile device 102 and the third social networking site 112.

The social networking sites 104, 108, 112 may be any Internet services. The social networking sites 104, 108, 112 may be hosted by a server computer that is implemented as a general purpose computer. General purpose computers are discussed in greater detail hereinafter. In an embodiment, the social networking sites 104, 108, 112 may include one or more of a GOOGLETALK Internet service, a FACEBOOK Internet service, a MYSPACE Internet service, a TWITTER Internet service, and a FRIENDSTER Internet service. The social networking sites 104, 108, 112 may promote providing presence information and/or other information about the user of the mobile device 102 to members of the social networking sites 104, 108, 112. For example, the presence information may indicate that the user of the mobile device 102 is at work, at home, working out, or other. The presence information may indicate that the user of the mobile device 102 is on-line and presumably currently available for interaction or off-line and unavailable for interaction. The presence information may indicate specific preferences and/or regularly scheduled activities and/or obligations of the user of the mobile device 102. For example, the information may include an indication that the user is very fond of a particular television show and regularly watches this show Tuesday evenings from 7 PM to 8 PM in their time zone. The social networking sites 104, 108, 112 may promote members sending messages to the mobile device 102 according to a format chosen by the social networking site. For example, the first social networking site 104 may send and receive messages in a first message format. The second social networking site 108 may send and receive messages in a second message format. The third social networking site 112 may send and receive messages in a third message format.

The network based interactive client server 120 may comprise a proxy application 122, a status map 124, a profiles component 126, and an address book. The network based interactive client server 120 may be implemented as a general purpose computer. General purpose computers are discussed in greater detail hereinafter. The proxy application 122 logs into the social networking sites 104, 108, 112 on behalf of the mobile device 102, or alternatively on behalf of the user of the mobile device 102, to provide presence information updates and other information updates to the social networking sites 104, 108, 112 and to mediate message transmissions between the mobile device 102 and the networking sites 104, 108, 112. In some contexts, the collective functionality provided by the proxy application 122, the status map 124, and the profiles component 126 may be referred to as a network based interactive client. From the perspective of the mobile device 102, the network based interactive client may play the role of a server; from the perspective of the social networking sites 104, 108, 112, the network based interactive client may play the role of a client.

In an embodiment, the proxy application 122 leverages the special position of the network based interactive client server 120 as part of a wireless service provider network. For example, a wireless service provider network is aware of the location of the mobile device 102 by virtue of the on-going handshaking information that the mobile device 102 provides to the base transceiver station 116. For example, at any given time the wireless service provider network may know with what serving cell and/or base transceiver station 116 the mobile device 102 is associated. For example, the wireless service provider network may know within what serving cell the mobile device 102 is located based on a visitor location register (VLR) and/or a home location register (HLR) and/or similar location databases maintained by the wireless service provider network. Additionally, the wireless service provider network may know the global positioning system (GPS) coordinates of the mobile device 102, promoting a more precise location of the mobile device 102 than provided by the knowledge of the serving cell. The proxy application 122 may share the location information with the social networking sites 104, 108, 112 to update presence information associated with the mobile device 102. In an embodiment, the proxy application 122 may withhold information about the precise location of the mobile device 102 but instead provide a named location of the mobile device 102 such as home, work, movies, restaurant, gym based on the precise location of the mobile device 102 and on the status map 124.

The wireless service provider network may infer a current activity of the mobile device 102 based on a service currently accessed by the mobile device 102, and the proxy application 122 may share the information about the current activity with the social networking sites 104, 108, 112 to update presence information associated with the mobile device 102. The wireless service provider network also may build and maintain a profile database based on communications of the mobile device 102 that the proxy application 122 may leverage to provide information about the user of the mobile device 102 to the social networking sites 104, 108, 112.

In an embodiment, the user of the mobile device 102 may use an interface of the mobile device 102, for example a keyboard, to access the clients 106, 110, 114 and configure social networking information and/or preferences. The mobile device 102 may define a mapping of presence information and other information to a status for the clients 106, 110, 114. The clients 106, 110, 114 may send the mapping information to the status map 124 on the network based interactive client server 120. For example, the mobile device 102 may be used to define a mapping between a day of the week, a time of day, and a location to a work status; a mapping between a day of the week, a time of day, and a location to a work out status; and a mapping between a day of the week and a time of day to a leisure status. The clients 106, 110, 114 may define a place name to be associated to a particular location. For example, the clients 106, 110, 114 may define home to be associated with one of a pair of global positioning system coordinates, a serving base transceiver station, and a cell sector identification. The clients 106, 110, 114 may define work to be associated with a different location.

The status map 124 may store the mappings. The proxy application 122 may interact with the status map 124 to determine a status of the mobile device 102, or perhaps more accurately a status of the user of the mobile device 102, and send the status to one or more of the social networking sites 104, 108, 112. The proxy application 122 may update the status and/or presence information of the mobile device 102 at the social networking sites 104, 108, 112 on a periodic basis, for example about every minute, about every five minutes, about every hour, or some other periodic interval. Alternatively, the proxy application 122 may update the status and/or presence information of the mobile device 102 at the social networking sites 104, 108, 112 as processing loads drop sufficiently and/or as network congestion permits. When a member of the social networking sites 104, 108, 112 accesses the information associated with the user of the mobile device 102, they will see the appropriate status of the mobile device 102, without the need of the mobile device 102 to explicitly update the presence information of the user. The mapping of information to status may be referred to in some contexts as status triggers. When the network based interactive client server 120 is maintained by a wireless service provider, the wireless service provider can know when the mobile device 102 is engaged in a phone call or a data session, and the proxy application 122 can leverage that access to information to update the presence information for the mobile device 102 on the social networking sites 104, 108, 112.

In an embodiment, the proxy application 122 may access profiles associated with the mobile device 102 and/or with the user of the mobile device 102 that are stored in the behavioral database 128. While shown as directly linked to the network based interactive client server 120, in some embodiments the behavioral database 128 may be maintained by another server (not shown), and the network based interactive client server 120 may communicate indirectly to the behavioral database 128 via the network 118. In an embodiment, the behavioral database 128 may be built and maintained by a wireless service provider and used for a variety of unrelated purposes in addition to being used by the proxy application 122. The proxy application 122 may determine information about the mobile device 102 and/or the user of the mobile device 102 based on information accessed from the behavioral database 128. For example, the behavioral database 128 may have been updated with information that the user of the mobile device 102 goes to a sports bar on most Sundays during the professional football season, and the proxy application 122 may update the social networking sites 104, 108, 112 with information indicating the user of the mobile device is at a sports bar on a specific Sunday afternoon.

The proxy application 122 may receive a first message in a first format directed to the mobile device 102 from the first social networking site 104. The first social networking site 104 sends the first message to the proxy application 122 because the proxy application 122 has logged in on behalf of the mobile device 102, as a proxy for the user. The proxy application 122 may map the first message to a second message in a second format and send the second message to the mobile device 102. The second format may be chosen so that the mobile device 102 is not interrupted by receiving the second message in the second format. For example, in an embodiment, the second format may be a short message service (SMS) format. In other embodiments, however, a different format may be employed by the proxy application 122 for communicating with the mobile device 102. The mobile device 102 may be able to receive the second message formatted in the short message service format without interrupting another on-going application, such as handling a voice call or conducting a data session. At a later time, the mobile device 102 may reply to the second message with a third message in the second format. The proxy application 122 may receive the third message from the mobile device 102, reformat the third message as a fourth message in the first format, and send the fourth message to the first social networking site 104. In some embodiments, the proxy application 122 may embed a reference in the second message that indicates that the content of the message originates from the first social networking site 104. The mobile device 102 may include the reference in the third message. The proxy application 122 may employ the reference in the third message to determine to which of the social networking sites 104, 108, 112 to send the fourth message.

In an embodiment, the messages received by the proxy application 122 from the social networking sites 104, 108, 112 may be reformatted and transmitted to the associated clients 106, 110, 114 on the mobile device 102. For example, messages from the first social networking site 104 may be reformatted by the proxy application 122 and transmitted to the first client 106 on the mobile device 102; messages from the second social networking site 108 may be reformatted by the proxy application 122 and transmitted to the second client 110 on the mobile device 102; and messages from the third social networking site 112 may be reformatted by the proxy application 122 and transmitted to the third client 114 on the mobile device 102. The role of the proxy application 122 in shuttling messages between the social networking sites 104, 108, 112 and the mobile device 102 may be referred to in some contexts as mediating communication between the mobile device 102 and the social networking sites 104, 108, 112.

The mobile device 102, for example the clients 106, 110, 114, also may directly log in to the social networking sites 104, 108, 112. In this case, the proxy application 122 may first log out of the subject social networking site 104, 108, 112 to allow the client 106, 110, 114 to log in directly. For example, the proxy application 122 may log out of the first social networking site 104, and the first client 106 may then log in to the first social networking site 104. In an embodiment, messages may be appended in an inbox, for example a short message service inbox, instead of displaying various messages in a social network site 104, 108, 112.

Figure 2:
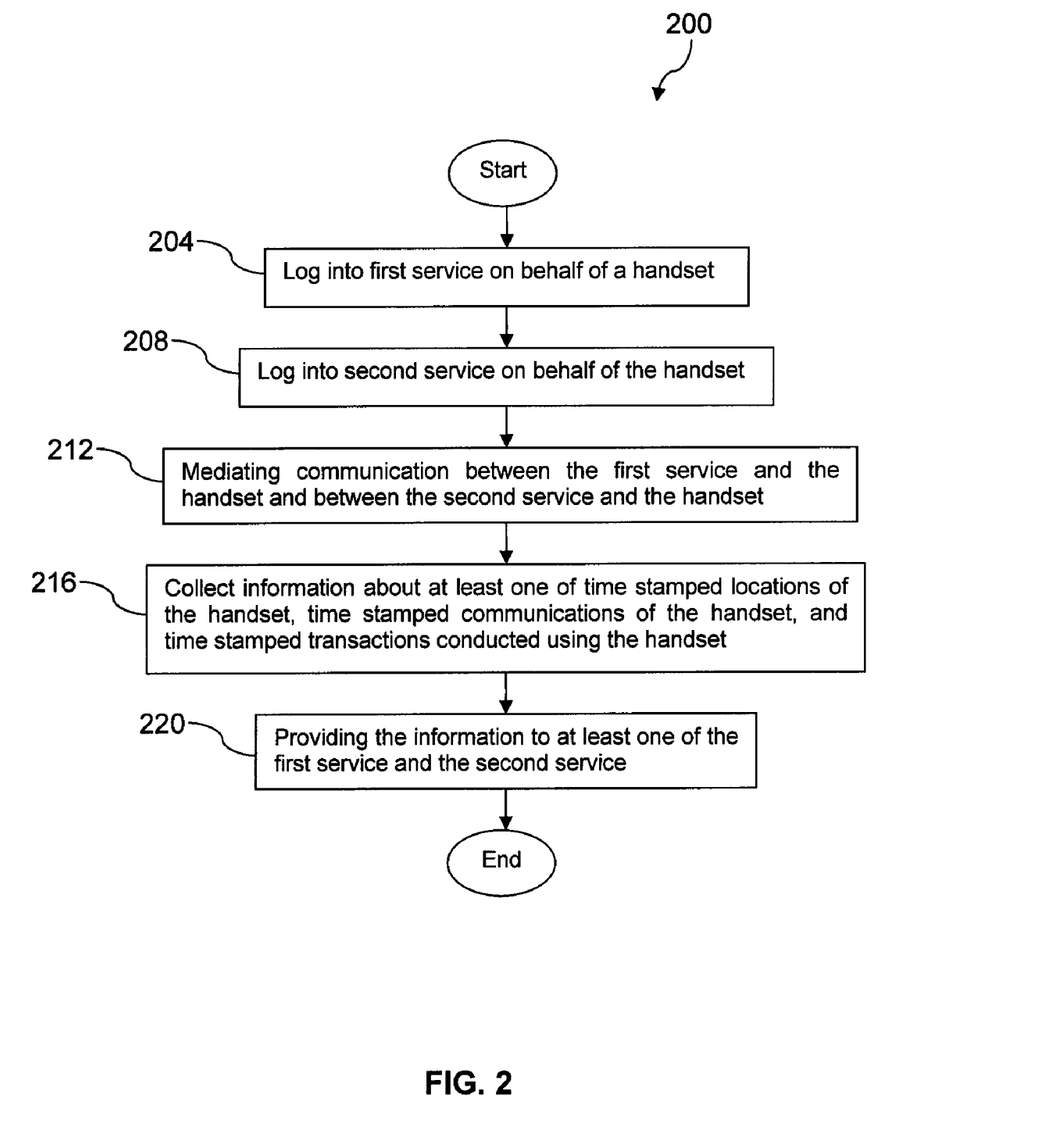
FIG. 2 is a flow chart of a method according to an embodiment of the disclosure.

Turning now to FIG. 2, a method 200 is discussed. At block 204, a first Internet service is logged into on behalf of a handset. For example, the proxy application 122 logs into one of the social networking sites 104, 108, 112 on behalf of the mobile device 102. As part of block 204, various authentication and identification information may be provided to the Internet service, for example a user name or user identification, a user password, and other authenticating information.

At block 208, a second Internet service is logged into on behalf of the handset. For example, the proxy application 122 logs into another one of the social networking sites 104, 108, 112 on behalf of the mobile device 102. Again, as part of block 208, various authentication and identification information may be provided to the Internet service, for example a user name or user identification, a user password, and other authenticating information.

At block 212, communication between the first Internet service and the handset and between the second Internet service and the handset is mediated. For example, the proxy application 122 may mediate communication between the first social networking site 104 and the mobile device 102 and between the second social networking site 108 and the mobile device 102. Mediating communication may involve a variety of functionalities and services including reformatting messages, relaying messages, caching messages for later delivery, and other services. In an embodiment, mediating communication may involve receiving a first message in a first format from the first social networking site 104, reformatting the first message as a second message in a second format, sending the second message to the mobile device 102, receiving a third message in the second format from the mobile device 102, reformatting the third message as a fourth message in the first message format, and sending the fourth message to the first social networking site 104. In an embodiment, mediating communication may also involve receiving a fifth message in a third format from the second social networking site 108, reformatting the fifth message as a sixth message in the second format, sending the sixth message to the mobile device 102, receiving a seventh message in the second format from the mobile device 102, reformatting the seventh message as an eighth message in the third message format, and sending the eighth message to the second social networking site 108. As described above with reference to FIG. 1, the proxy application 122 may embed a reference to the first social networking site 104 in the second message and a reference to the second social networking site 108 in the sixth message. In an embodiment, a plurality of messages may be sent at one time by a unified mobile client with separate plug-ins for each of the social networking sites 104, 108, 112, thereby reducing the number of network calls.

At block 216, information associated with the handset is collected. For example, information about the locations of the mobile device 102 at specific times is collected, information about communications of the mobile device 102 at specific times is collected, and information about transactions and/or data packet exchanges of the mobile device 102 at specific times is collected. The association of time to the location, communications, and transactions of the mobile device 102 may be represented and/or captured in the form of data and time stamps. In an embodiment, the proxy application 122 collects the location, communications, and transaction information, possibly from several sources. In an embodiment, the proxy application 122 may communicate with servers in a wireless service provider network to collect some of the location, communications, and transactions information. Additionally, in some circumstances, the proxy application 122 may work with the status map 124 and the profiles component 126 to infer some of the information, for example location of the mobile device 102.

At block 220, the information associated with the handset that was collected in block 216 is provided to one or more Internet services. For example, the proxy application 122 provides presence information and other information to the social networking sites 104, 108, 112. The processing of blocks 212, 216, and 220 may be repeated in a looping fashion or a substantially continuous fashion. In an embodiment, the processing at block 220 occurs during a period that network congestion is at a diminished level or a low level. Additionally, in an embodiment, the proxy application 122 may periodically log out of the Internet services, for example the social networking sites 104, 108, 112, and log back in, either immediately or after a period of time. For example, the proxy application 122 may log out of the Internet services daily or weekly or some other effective periodic interval.

Figure 3:
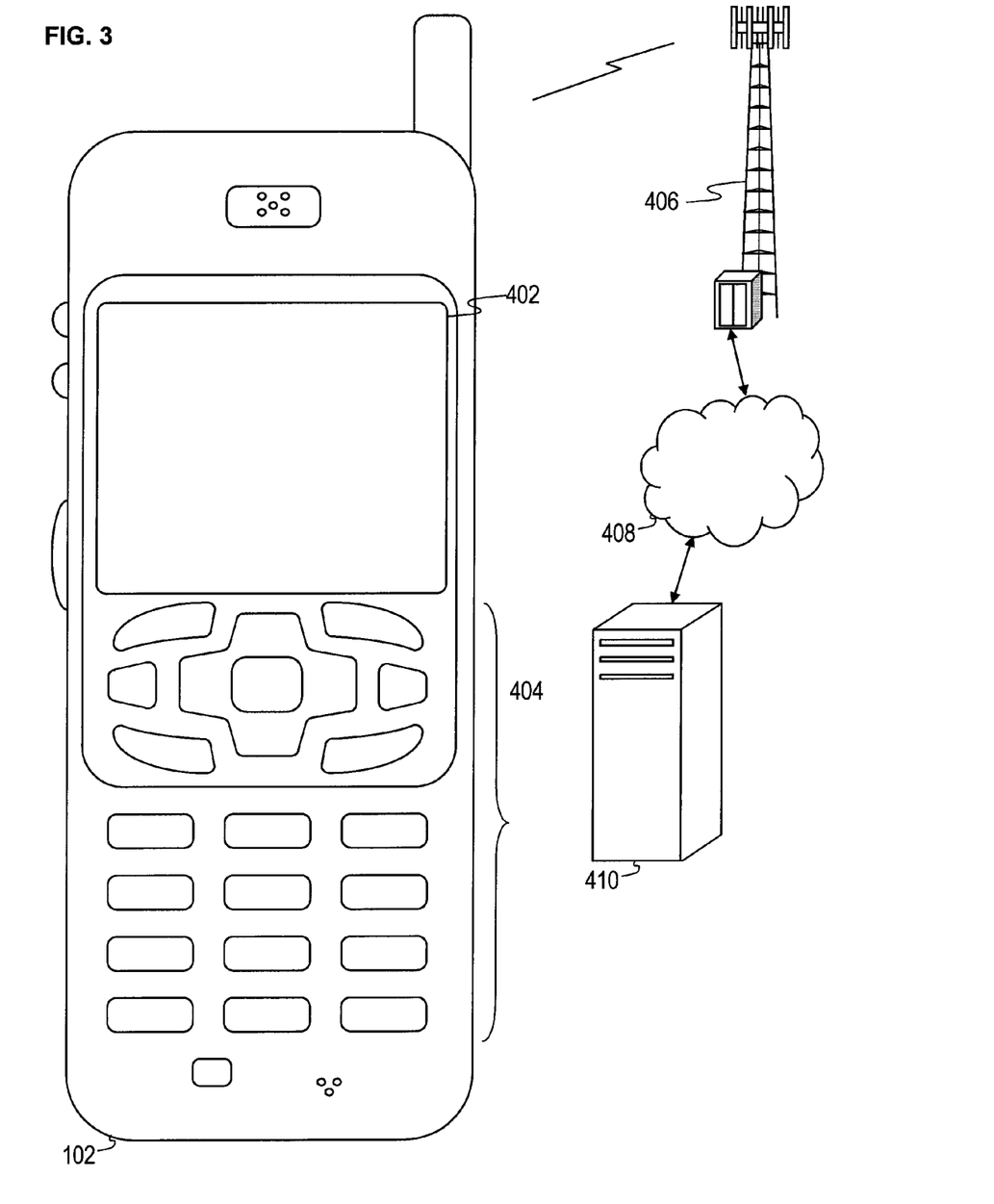
FIG. 3 is an illustration of a mobile device according to an embodiment of the disclosure.

FIG. 3 shows a wireless communications system including the mobile device 102. FIG. 3 depicts the mobile device 102, which is operable for implementing aspects of the present disclosure, but the present disclosure should not be limited to these implementations. Though illustrated as a mobile phone, the mobile device 102 may take various forms including a wireless handset, a pager, a personal digital assistant (PDA), a gaming device, an inventory control device, a media player, a digital camera, a digital calculator, a portable computer, a tablet computer, a laptop computer, and/or other. Many suitable handsets combine some or all of these functions. In some embodiments of the present disclosure, the mobile device 102 is not a general purpose computing device like a portable, laptop or tablet computer, but rather is a special-purpose communications device such as a mobile phone, wireless handset, pager, or PDA. The mobile device 102 may support specialized activities such as gaming, inventory control, job control, and/or task management functions, and so on.

The mobile device 102 includes a display 402 and a touch-sensitive surface or keys 404 for input by a user. The mobile device 102 may present options for the user to select, controls for the user to actuate, and/or cursors or other indicators for the user to direct. The mobile device 102 may further accept data entry from the user, including numbers to dial or various parameter values for configuring the operation of the handset. The mobile device 102 may further execute one or more software or firmware applications in response to user commands. These applications may configure the mobile device 102 to perform various customized functions in response to user interaction. Additionally, the mobile device 102 may be programmed and/or configured over-the-air, for example from a wireless base station, a wireless access point, or a peer mobile device 102.

The mobile device 102 may execute a web browser application which enables the display 402 to show a web page. The web page may be obtained via wireless communications with a base transceiver station (BTS) 406, a wireless network access node, a peer mobile device 102 or any other wireless communication network or system. While a single base transceiver station 406 is illustrated, it is understood that the wireless communication system may comprise additional base transceiver stations. In some instances, the mobile device 102 may be in communication with multiple base transceiver stations 406 at the same time. The base transceiver station 406 (or wireless network access node) is coupled to a wired network 408, such as the Internet. Via the wireless link and the wired network, the mobile device 102 has access to information on various servers, such as a server 410. The server 410 may provide content that may be shown on the display 402. Alternately, the mobile device 102 may access the base transceiver station 406 through a peer mobile device 102 acting as an intermediary, in a relay type or hop type of connection.

Figure 4:
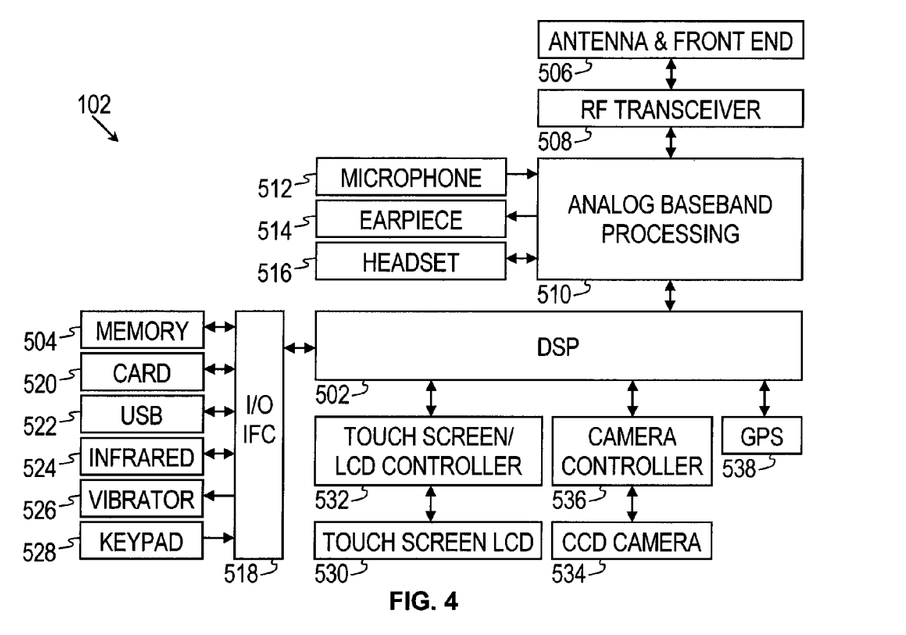
FIG. 4. is a block diagram of a mobile device according to an embodiment of the disclosure.

FIG. 4 shows a block diagram of the mobile device 102. While a variety of known components of mobile devices 102 are depicted, in an embodiment a subset of the listed components and/or additional components not listed may be included in the mobile device 102. The mobile device 102 includes a digital signal processor (DSP) 502 and a memory 504. As shown, the mobile device 102 may further include an antenna and front end unit 506, a radio frequency (RE) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the mobile device 102 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the mobile device 102 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the mobile device 102 to send and receive information from a radio access network (RAN) or some other available wireless communications network or from a peer mobile device 102. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF transceiver 408, portions of the antenna and front end 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset port 516 and outputs to the earpiece speaker 514 and the headset port 516. To that end, the analog baseband processing unit 510 may have ports for connecting to the built-in microphone 512 and the earpiece speaker 514 that enable the mobile device 102 to be used as a mobile phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide internet connectivity, enabling a user to gain access to content on the internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 102 to function as a peripheral device to exchange information with a personal computer or other computer system. The infrared port 524 and other optional ports such as a Bluetooth interface or an IEEE 802.11 compliant wireless interface may enable the mobile device 102 to communicate wirelessly with other nearby handsets and/or wireless base stations.

The input/output interface 518 may further connect the DSP 502 to the vibrator 526 that, when triggered, causes the mobile device 102 to vibrate. The vibrator 526 may serve as a mechanism for silently alerting the user to any of various events such as an incoming call, a new text message, and an appointment reminder.

The keypad 528 couples to the DSP 502 via the interface 518 to provide one mechanism for the user to make selections, enter information, and otherwise provide input to the mobile device 102. Another input mechanism may be the touch screen LCD 530, which may also display text and/or graphics to the user. The touch screen LCD controller 532 couples the DSP 502 to the touch screen LCD 530.

The CCD camera 534 enables the mobile device 102 to take digital pictures. The DSP 502 communicates with the CCD camera 534 via the camera controller 536. The GPS sensor 538 is coupled to the DSP 502 to decode global positioning system signals, thereby enabling the mobile device 102 to determine its position. In another embodiment, a camera operating according to a technology other than charge coupled device cameras may be employed. Various other peripherals may also be included to provide additional functions, e.g., radio and television reception.

Figure 5:
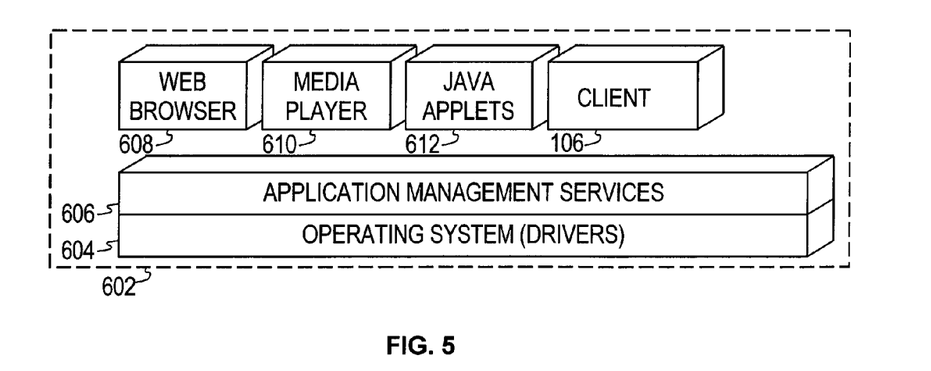
FIG. 5 is an illustration of a software architecture for a mobile device according to an embodiment of the disclosure.

FIG. 5 illustrates a software environment 602 that may be implemented by the DSP 502. The DSP 502 executes operating system drivers 604 that provide a platform from which the rest of the software operates. The operating system drivers 604 provide drivers for the handset hardware with standardized interfaces that are accessible to application software. The operating system drivers 604 include application management services ("AMS") 606 that transfer control between applications running on the mobile device 102. In some embodiments the operating system drivers 604 may only support single threaded execution of applications. In other embodiments, however, the operating system drivers 604 support multi-threaded and/or concurrent execution of a plurality of applications. Also shown in FIG. 5 are a web browser application 608, a media player application 610, and JAVA applets 612. The web browser application 608 configures the mobile device 102 to operate as a web browser, allowing a user to enter information into forms and select links to retrieve and view web pages. The media player application 610 configures the mobile device 102 to retrieve and play audio or audiovisual media. The JAVA applets 612 configure the mobile device 102 to provide games, utilities, and other functionality. Also shown in FIG. 5 is the first client 106. While the second client 110 and the third client 114 are not shown in FIG. 5, their position in the software architecture would be similar to that of the first client 106.

Figure 6:
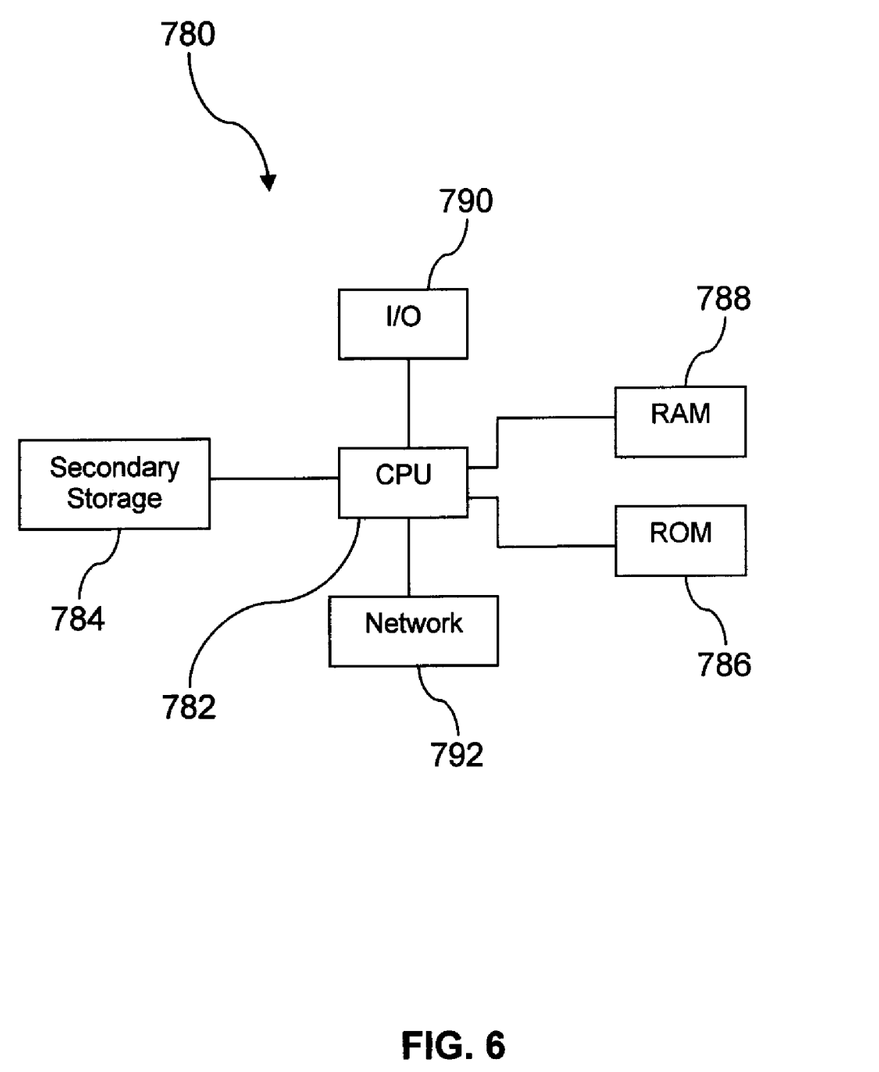
FIG. 6 is an illustration of an exemplary general purpose computer system suitable for implementing some aspects of the disclosure.

Some aspects of the system described above, for example the network based interactive client server 120 and the social networking sites 104, 108, 112, may be implemented on any general-purpose computer with sufficient processing power, memory resources, and network throughput capability to handle the necessary workload placed upon it. FIG. 6 illustrates a typical, general-purpose computer system suitable for implementing one or more embodiments disclosed herein. The computer system 780 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor may be implemented as one or more CPU chips.

The secondary storage 784 is typically comprised of one or more disk drives or tape drives and is used for non-volatile storage of data and as an over-flow data storage device if RAM 788 is not large enough to hold all working data. Secondary storage 784 may be used to store programs which are loaded into RAM 788 when such programs are selected for execution. The ROM 786 is used to store instructions and perhaps data which are read during program execution. ROM 786 is a non-volatile memory device which typically has a small memory capacity relative to the larger memory capacity of secondary storage. The RAM 788 is used to store volatile data and perhaps to store instructions. Access to both ROM 786 and RAM 788 is typically faster than to secondary storage 784.

I/O devices 790 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 792 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), and/or worldwide interoperability for microwave access (WiMAX) radio transceiver cards, and other well-known network devices. These network connectivity devices 792 may enable the processor 782 to communicate with an internet or one or more intranets. With such a network connection, it is contemplated that the processor 782 might receive information from the network, or might output information to the network in the course of performing the above-described method steps. Such information, which is often represented as a sequence of instructions to be executed using processor 782, may be received from and outputted to the network, for example, in the form of a computer data signal embodied in a carrier wave.

Such information, which may include data or instructions to be executed using processor 782 for example, may be received from and outputted to the network, for example, in the form of a computer data baseband signal or signal embodied in a carrier wave. The baseband signal or signal embodied in the carrier wave generated by the network connectivity devices 792 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 782 executes instructions, codes, computer programs, scripts which it accesses from hard disk, floppy disk, optical disk (these various disk based systems may all be considered secondary storage 784), ROM 786, RAM 788, or the network connectivity devices 792. While only one processor 792 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method, comprising:
   a proxy application logging into a first internet service on behalf of a handset, the proxy application executing on a computer system in a communications service provider network;
   the proxy application logging into a second internet service on behalf of the handset;
   the proxy application mediating communication between the first internet service and the handset and between the second internet service and the handset, wherein mediating communication between the first internet service and the handset and between the second internet service and the handset comprises:
      the proxy application receiving a first message in a first format from the first internet service;
      the proxy application translating the first message to a second message in a short message service format;
      the proxy application transmitting the second message to the handset;
      the proxy application receiving a third message in a second format from the second internet service;
      the proxy application translating the third message to a fourth message in the short message service format;
      the proxy application transmitting the fourth message to the handset;
      the proxy application receiving a fifth message in the short message service format from the handset;
      the proxy application translating the fifth message to a sixth message in the first format;
      the proxy application transmitting the sixth message to the first internet service;
      the proxy application receiving a seventh message in the short message service format from the handset;
      the proxy application translating the seventh message to an eighth message in the second format; and
      the proxy application transmitting the eighth message to the second internet service;
   collecting an information about at least one of time stamped locations of the handset, time stamped communications of the handset, and time stamped transactions conducted using the handset; and the proxy application providing the information to at least one of the first internet service and the second internet service.

2. The method of claim 1, further comprising mapping the information about at least one of time stamped locations of the handset, time stamped communications of the handset, and time stamped transactions conducted using the handset to a status, wherein the status is provided to at least one of the first internet service and the second internet service.

3. The method of claim 2, further comprising creating a map from at least one of time stamped locations of the handset, time stamped communications of the handset, and time stamped transactions conducted using the handset to a plurality of statuses.

4. The method of claim 3, further comprising receiving messages from the handset identifying the statuses and the mapping of the statuses to the at least one of time stamped locations of the handset, time stamped communications of the handset, and time stamped transactions conducted using the handset.

5. A system, comprising:
   at least one processor; and
   a component that, when executed by the at least one processor, establishes sessions on behalf of a user of a single threaded handset with a plurality of internet services, collects information about at least one of time stamped locations of the single threaded handset, time stamped communications of the single threaded handset, and time stamped transactions conducted using the single threaded handset, determines and transmits a presence information associated with the single threaded handset to at least one of the internet services based on the collected information without requiring interaction from the user, and mediates communications between the single threaded handset and the internet services,
   wherein the component mediates the communications between the single threaded handset and a first internet service of the plurality of internet services by translating a first message received from the first internet service in a format native to the first internet service to a first translated message in a short message service format, and by sending the first translated to the single threaded handset,
   wherein the component further mediates the communications between the first internet service and the single threaded handset by translating a first response message received from the single threaded handset in the short message service format to a first response translated message in the format native to the first internet service, and by sending the first response translated message to the first internet service, and
   wherein the processor is not co-located with either the handset or the internet services.

6. The system of claim 5, wherein the component maintains a map that associates the information about at least one of time stamped locations of the single threaded handset, time stamped communications of the single threaded handset, and time stamped transactions conducted using the single threaded handset to a user status, and the component determines the presence information based at least in part on mapping the information about at least one of time stamped locations of the single threaded handset, time stamped communications of the single threaded handset, and time stamped transactions conducted using the single threaded handset to the user status.

7. The system of claim 6,
   wherein the presence information comprises the user status.

8. The system of claim 5, wherein the information about a location of the handset, the component maintains a map that associates the information about at least one of time stamped locations of the single threaded handset, time stamped communications of the single threaded handset, time stamped transactions conducted using the single threaded handset, and at least one of a time and a day to a user status, and the component determines the presence information based at least in part on mapping the information about at least one of time stamped locations of the single threaded handset, time stamped communications of the single threaded handset, and time stamped transactions conducted using the single threaded handset, and at least one of the time and the day to the user status.

9. The system of claim 5, wherein the component associates a reference with the first message and the first translated message comprises the reference.

10. The system of claim 5, wherein the component associates a reference with the first message and the first translated message comprises the reference and wherein when the first response message is a response to the first translated message, the first response message comprises the reference and the component associates the first response message with the first internet service based on the reference.

11. A system, comprising:
    a computer system; and
    an application that, when executed on the computer system, logs into a plurality of internet services on behalf of a user of a handset, wherein the handset is a single threaded handset, and wherein the internet services includes a first internet service, collects information about at least one of time stamped locations of the handset, time stamped communications of the handset, and time stamped transactions conducted using the handset, determines and provides presence information associated with the handset to the internet services based on the collected information without requiring interaction from the user, converts a first message received from the first internet service in a native format of the first internet service to a first translated message formatted in a short message service format, sends the first translated message to the handset, wherein sending the first translated message to the handset does not interfere with the ability of the handset to receive a phone call, receives a first response message formatted in the short message service format from the handset, converts the first response message to a first response translated message in the native format of the first internet service, and sends the first response translated message to the first internet service.

12. The system of claim 11, wherein the internet services are a social networking service.

13. The system of claim 11, wherein the presence information comprises location information based on one of a global positioning system coordinate associated with the handset and a serving base transceiver station associated with the handset.

14. The system of claim 13, wherein the location information comprises a location name associated with the one of the global positioning system coordinate and the serving base transceiver station.

15. The system of claim 11, wherein the presence information comprises a current activity of the handset based on a service currently accessed by the handset.

* * * * *